June 4, 1935.  J. F. STARK  2,003,909

ELECTRICAL OUTLET RECEPTACLE

Filed June 14, 1933

Inventor,
John Frank Stark,
By
Minturn *Minturn*,
Attorneys.

Patented June 4, 1935

2,003,909

UNITED STATES PATENT OFFICE 2,003,909

ELECTRICAL OUTLET RECEPTACLE

John Frank Stark, Rushville, Ind., assignor of one-fourth to Dwight G. Van Osdol, one-fourth to George J. Griesser, and one-fourth to Michael Katsaros Application June 14, 1933, Serial No. 675,715

9 Claims. (Cl. 247—21)

This invention relates to the art of outlet boxes such as are employed in electrical wiring to provide for fixture, switch and other outlets. In many buildings, it is customary to employ materials such as expanded metal lath, so called "wall board" either of the fiber or plaster board type, as a ground for plastering or as a finished wall. Where such materials are employed in the wall, the heretofore customarily employed outlet boxes could not be securely attached to the wall since such materials would not furnish a sufficient grip or securing of the screws used in attaching the boxes to the wall. The result was that the receptacle soon became loosened from the wall and hung on the wires entering the boxes creating a fire hazard.

Figure 1:
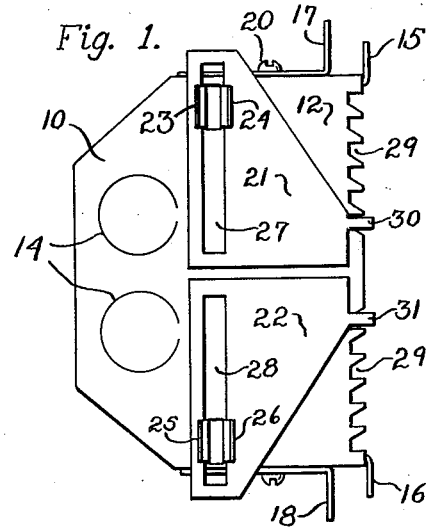
Figure 2:
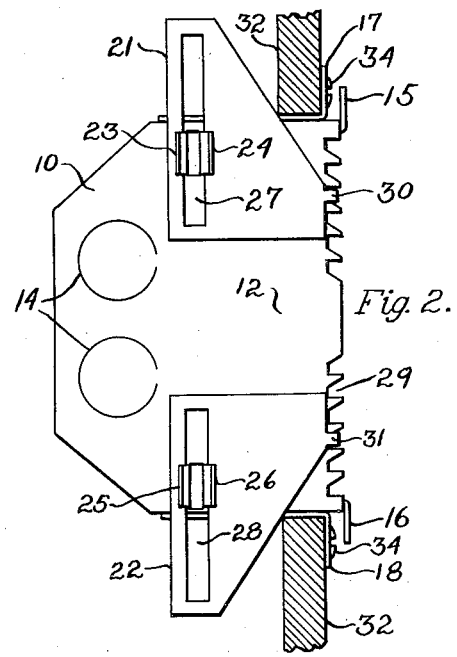
Figure 3:
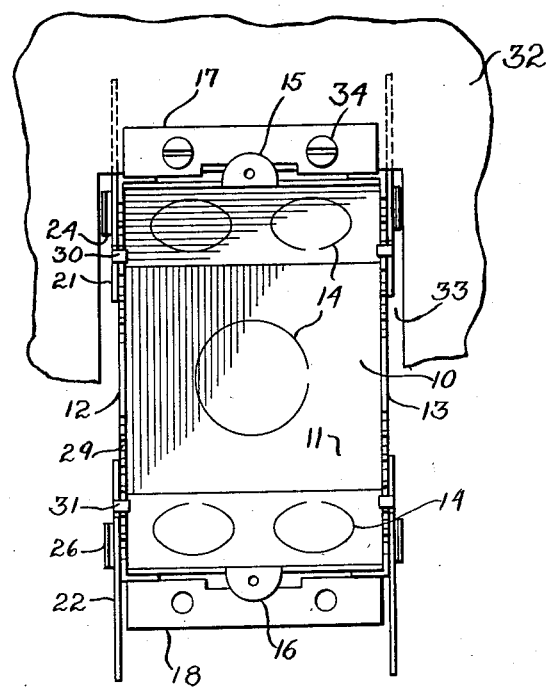

It is the primary object of my invention to provide a simple inexpensive device which may be employed to securely anchor the outlet boxes to walls employing materials as above indicated wherein screws and the like are not retained. Further objects and advantages of the invention will become apparent to those versed in the art by the following description, such as the simplicity of operation and low cost of production with ease of installation, with reference being made to the accompanying drawing, in which Fig. 1 is a side elevation of an outlet box embodying my invention;

Fig. 2, a similar side elevation showing the box in an applied position;

Fig. 3, a front elevation, and

Figure 4:
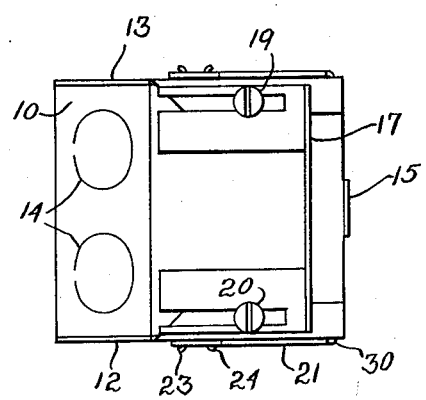

Fig. 4, a top plan view.

Like characters of reference indicate like parts throughout the several views in the drawing.

The outlet box herein shown to which my invention is applied is generally designated by the numeral 10 and has a rectangular opening entering therein from the front side, the customary bottom 11 sloping upwardly at each end to connect with the top and bottom of the box, and the side walls 12 and 13. The box is provided with the usual "knock-outs" 14 through which wires or conduits may be inserted to enter within the box. The top and bottom walls of the receptacle are provided with the vertically disposed ears 15 and 16 respectively to which switches or the like to be carried into the box may be attached. Also carried on the top and bottom walls of the box are the adjustable stops 17 and 18 having slotted legs in sliding contact with the walls, through the slots of which screws 19 and 20 are passed to enter the walls as means for retaining the stops at selected positions in reference to the front edge of the box.

On the side 12 of the box are carried two slides 21 and 22 by means of ears 23, 24 and 25, 26 punched out of the side of the box to extend through slots 27 and 28 respectively and then be bent over to retain the slides in sliding contact with the outer face of the box side. The forward upper and lower corners respectively of the slides 21 and 22 are cut off to leave diagonal edges sloping upwardly and downwardly respectively toward the rear of the slides.

The outer front edges of the sides 12 and 13 of the box are provided with a plurality of notches 29 with the edges of those notches nearest the center of the sides being straight and the opposite edges thereof sloped backwardly and outwardly toward the outer ends of the respective sides as indicated in Fig. 1. Each slide 21 and 22 has its front edge terminating just back of the front edges of the box sides and preferably along the line of the inner ends of the notches. From the front edges of the slides extend tongues 30 and 31 respectively which have a width permitting the tongues to be bent over to extend across the edges of the box sides through the notches 29.

In employing the box embodying my invention, a hole is cut through the wall material 32 sufficiently large to permit the box to be inserted therethrough when the slides are retracted to have their inner edges brought one toward the other to approach each other in the central horizontal plane on the box. Such a hole 33 is indicated in the fragmentary portion of the wall 32 in Fig. 3. The mounting flanges 17 and 18 are previously adjusted and secured on the top and bottom ends of the box so that when they are brought into contact with the wall portion 32, as in Fig. 2, the mounting ears 15 and 16 are spaced outwardly from the wall the distance desired. The box may be secured in the usual way by placing screws 34 through the mounting flanges to have the screws engage in the wall. However this is not necessary and in fact is of little purpose where the wall is of the soft or loose texture. With the box inserted through the hole in the wall 32 as indicated, the slides 21 and 22 on each side of the box are shoved upwardly and downwardly by means of the tongues 30 and 31 to have the sloping edges of the slides come into contact with the rear edges of the wall material as indicated in Fig. 2 whereupon the tongues 30 and 31 are bent over inwardly to extend across the respective notches appearing at the sides of the tongues. Since the edges of the notches are sloped as above indicated, the tongues 30 and 31 as they are bent across the notches will be urged by these sloping edges upwardly and downwardly respectively to carry the slides correspondingly into tighter engagement with the wall 32 tending to compress the wall between the sloping edges and the flanges 17 and 18, thereby effecting a very secure placement of the box such that the box can not be pulled outwardly or shifted. Of course the box may be removed by straightening the tongues 30 and 31 and withdrawing the slides from behind the front to permit the box being pulled out through the wall.

It is thus to be noted that I have provided a very simple structure which may be securely fixed in a wall without danger of becoming loose and that dependence is not placed upon screws or the like.

While I have here shown and described my invention in the one best form as now known to me, it is obvious that structural changes may be employed without departing from the spirit of the invention and I, therefore, do not desire to be limited to that precise form beyond the limitations as may be imposed by the following claims.

I claim:

1. An outlet box having side walls and ends, means on the box ends for bearing against the outer side of a wall, slides carried on the box sides having wall contacting portions oblique to each other and to the adjacent side of the wall, and means for interengaging and retaining the slides with and on the box sides whereby the slides may be passed through and held behind the wall to cause the wall to be compressively engaged between the oblique portions of the slides and said bearing means, said interengaging means comprising bendable members carried by one of the members to be joined and bent over holding formations of the other of the members to be joined and said box sides having a series of serrations each having a sloping side to contact a bendable member when the member is bent against a serration.

2. An outlet box having side walls and ends, means on the box ends for bearing against the outer side of a wall, slides carried on the box sides having wall contacting portions oblique to each other and to the adjacent side of the wall, and means for interengaging and retaining the slides with and on the box sides whereby the slides may be passed through and held behind the wall to cause the wall to be compressively engaged between the oblique portions of the slides and said bearing means, said interengaging means comprising bendable members carried by one of the members to be joined and bent over holding formations of the other of the members to be joined and said box sides having a series of serrations each having a sloping side to contact a bendable member when the member is bent against a serration, said serrations having a side sloping in the direction of the oblique portions of the slide.

3. An outlet box adapted to be inserted through a hole in a wall, members projecting from the box to contact the outer side of the wall to prevent the withdrawal of the box through the hole, wedge shaped slides on the other side of the wall from the first members and projecting into the hole and movable on the box to contact the wedge slides against the edges of the hole, and means for retaining a given position of the movable members.

4. An outlet box adapted to be inserted through a hole in a wall, members projecting from the box to contact the outer side of the wall to prevent the withdrawal of the box through the hole, wedge shaped slides on the other side of the wall from the first members and projecting into the hole and movable on the box to contact the wedge slides against the edges of the hole, and means for retaining a given position of the movable slides, said retaining means being operable from the same side of the wall which is contacted by said first members.

5. An outlet box adapted to be inserted through a hole in a wall, members projecting from the box to contact the outer side of the wall to prevent the withdrawal of the box through the hole, wedge shaped slides on the other side of the wall from the first members and projecting into the hole and movable on the box to contact the wedge slides against the edges of the hole, and means for retaining a given position of the movable slides, said retaining means comprising tongues bent to interengage the movable slides with the box.

6. An outlet box adapted to be inserted through a hole in a wall, members projecting from the box to contact the outer side of the wall to prevent the withdrawal of the box through the hole, wedge shaped slides on the other side of the wall from the first members and projecting into the hole and movable on the box to contact the wedge slides against the edges of the hole, and means for retaining a given position of the movable slides, said retaining means comprising tongues on the wedge shaped slides and serrations on the box engaged by the tongues.

7. An outlet box adapted to be inserted through a hole in a wall, members projecting from the box to contact the outer side of the wall to prevent the withdrawal of the box through the hole, wedge shaped slides on the other side of the wall from the first members and projecting into the hole and movable on the box to contact the wedge slides against the edges of the hole, and means for retaining a given position of the movable slides, said retaining means comprising tongues on the wedge shaped slides and serrations on the box engaged by the tongues, said serrations having sides sloped in the general direction of the slope of the wedge shaped movable slide carrying the tongue.

8. An outlet box, members attached to the box to contact a side of a wall at a hole in the wall, slidable members carried by the box and extending through the hole, guide means extending from the box and engaging the slidable members, said slidable members each being oblique to the face of the wall to wedge against the wall where it passes through the hole in the wall, tongues extending from the slidable members and serrations on the box into which the tongues are bent.

9. An outlet box, members attached to the box to contact a side of a wall at a hole in the wall, slidable members carried by the box and extending through the hole, guide means extending from the box and engaging the slidable members, said slidable members each being oblique to the face of the wall to wedge against the wall where it passes through the hole in the wall, tongues extending from the slidable members and serrations on the box into which the tongues are bent, said slidable members having slots and said guide means comprising members extending through the slots.

JOHN FRANK STARK.